Dec. 26, 1950   G. H. EARP-THOMAS   2,535,627
ACTIVATED COMPOSTER
Filed June 16, 1948
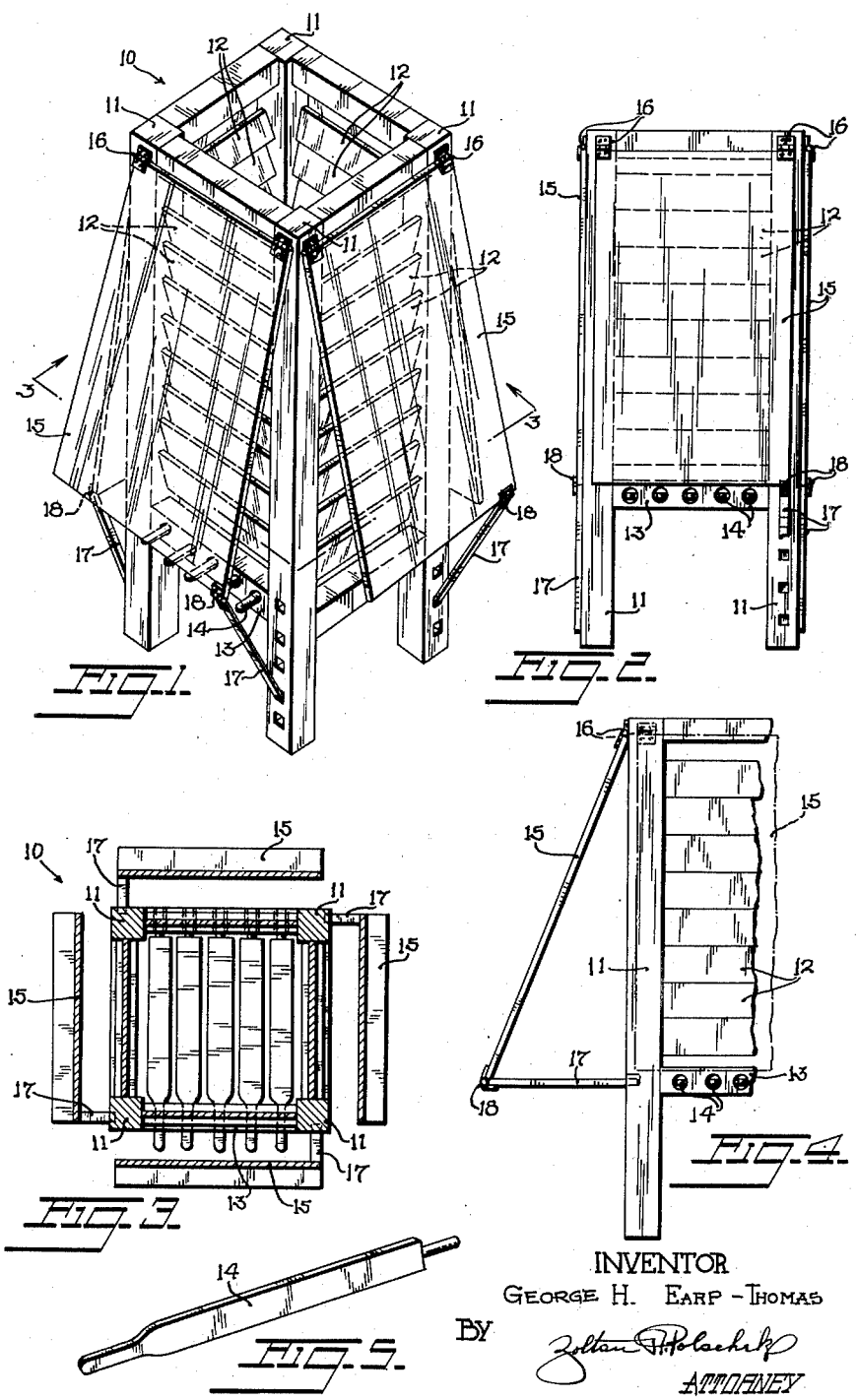
INVENTOR
GEORGE H. EARP-THOMAS
BY
ATTORNEY Patented Dec. 26, 1950

2,535,627

UNITED STATES PATENT OFFICE 2,535,627

ACTIVATED COMPOSTER

George H. Earp-Thomas, Glen Ridge, N. J.

Application June 16, 1948, Serial No. 33,426

3 Claims. (Cl. 98—54)

This invention relates to an activated composter. While not limited thereto, it is particularly concerned with improved means and a method for decomposition of organic waste material including leaves, grass, straw, manure, garbage, sewage, feathers, animal and trade waste such as tea leaves, coffee grounds and cocoa waste.

Due to the shortage of organic matter in the soil and the consequent depletion of soil and erosion great interest is generally observed in conserving waste on suburban estates and in cities, particularly wherever gardens are located.

The new invention permits easy decomposition of all types of organic matter so as to feed and fertilize the soil and supplement and advance the growth of plants therein at minimum expense and trouble. It will accordingly be noted that the new process and device is almost completely automatic in spite of the apparent lack of moving parts therein and that, moreover, the new device will readily permit best results substantially without the disagreeable handling of refuse.

This invention includes a method for handling refuse and a specially constructed container which I call a "composter" and which is more fully described hereinafter. For the purpose of activating the composting action and in accordance with one preferred method of the execution of my invention, I may use aerobic bacteria selected from decaying organic matter having a neutral or slightly alkaline pH. These bacteria may be retained in pure cultures in the laboratory and when ready for shipment are placed in a medium suitable for growth with nutrients to maintain them in live condition for at least a year.

The medium may vary but I have found one per cent of sugar and/or molasses and one per cent of combined potassium carbonate, sodium chloride, magnesium sulphate and calcium phosphate, said percentage being based upon the amount of total matter present or not more than 2% or 2% of hard wood ashes and 1% of molasses. The medium should be dissolved in water and added to the base, which is preferably humus or another suitable carrier, such as charcoal or finely sifted digested organic matter.

While pure cultures of bacteria are more desirable, after a time, when the composter is in full operation, suitable activator will be found in the residue coming from the digester. Thus I propose to take incompletely decomposed compost from the bottom of my device to dry it to a moisture content of 20% or less at which point it will pack and keep well and to utilize the resulting product as my activator.

Either base may be used in the composter to hasten decomposition. It is advisable, however, that the compost materials be mixed up so as to avoid individual layers of separate types of waste strata and it is accordingly suggested that these materials be stirred up with more active types of agents such as those found in garbage or manure so as to homogenize them and prevent delay in the action. In any case, the organic matter should be neutralized with lime, which is mixed in. The organic material is placed in the composter when the microbes heat a product to 80 to 90 degrees Fahrenheit.

The microbes will decay the material fast enough even in a small sized composter to keep up with all the waste available from the use of families even including those having a large number of members.

Bacteria require food and some types of waste matter are poor in nitrogen and the bacteria would not find food to rapidly break down the organic matter. To overcome this condition, it is advisable to use sufficient lime to make the material slightly alkaline and to supply nitrogen in an available form such as sulphate of ammonia. These two may be mixed together and a small amount mixed up with the organic matter before it is put in the composter. This hastens the growth of many kinds of decay bacteria and insures a rapid decomposition of the organic matter. Supplies of this material may be purchased on the open market. Another suitable food for the bacteria is calcium nitrate and mixed fertilizer like 5—10—5 also can be used but is not as satisfactory. When a nutrient is supplied inoculation may not be necessary, but usually produces a better compost free from some impurities. Furthermore, it hastens decomposition.

It will be noted that my composter is suitable for year around growth of bacteria and/or nutrients to convert the waste into dark granular or lumpy humus. The resulting humus is superior to the compost which is usually made on the ground because the product of my invention receives air from all sides thus hastening the growth and activity of aerobic microbes without the gas or putrefication or leaching out of valuable nitrates and other salts inherent in other production methods.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a composter made in accordance with the invention before assembly.

Fig. 2 is a side elevational view of the composter.

Fig. 3 is a horizontal cross sectional view of a composter at line 3—3 of Fig. 1.

Fig. 4 is a side elevation of a shield opened and in place.

Fig. 5 is a top plan view of a shaker slat.

A preferred composter, in accordance with my invention, may be described as a square louvred box 10. It will usually have four posts 11, e. g. four by four and perhaps five feet high. All sides will be covered with louvres 12, several inches wide, sloped inward and downward and about two feet long and less than an inch in thickness. The louvres will be spaced apart by two inches, for example, so as to let the air enter, but this distance may vary.

The top of the box should be open so as to provide a convenient entrance for the waste material. The bottom 13 should have slats which may be stationary or can have a shaker 14 such as is used in a furnace for rapid removal of the finished products.

While I prefer a small composter, of about four foot wide and four foot deep because it has been observed that decomposition is rapid at that width and slower at greater widths because the air has difficulty in penetrating more than two feet and accordingly slower decomposition rates will be observed at larger dimensions. Larger composters may be used and are encompassed within the scope of the invention.

The bottom of the composter will be located a foot or more above the ground so as to provide ample room for the removal of humus from below. On all four sides of the composter should have air shields 15 secured by adjustable bolts so that they may be moved closer or further away. This regulates the amount of air that is carried to the organic matter through the louvres and permits adjustment to retain heat produced by the microbic action at its optimum between 80 and 140 degrees Fahrenheit. The shield may be closed if too cold and opened if too hot. It permits thus complete control of the decomposition.

The shield may be made of light metal or wood and may be hinged at the top by hinge 16 and open at the bottom on a bolt 17 joined by a pivot 18 to supply the desired amount of air. The shield should cover the louvres only and end just above the shaker slats or bottom louvres 19.

In the operation of the invention and as the material decays, it will become granular and fall through the open slats at the bottom but will not discharge ordinary garbage, leaves, straw, etc. until well decomposed. The shaker which may be a pivoted bottom slat will remove the fine particles. An emergency door may be present at the bottom so as to permit withdrawal of treated matter at the bottom when wet weather clumps it together to prevent it from passing between bottom slats. In wet climates a movable lid on top of the composter may be provided to prevent the material from becoming waterlogged.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A composter, comprising a bottom frame, posts extended vertically between the corners of said frames, louvers mounted horizontally between adjacent posts and slanted downward and inward, grates mounted across the bottom frame, air shields having their top ends pivotally attached to the top frame and having their bottom ends extended downward across the outer faces of said louvers to the bottom frame, and means for holding said air shields in various pivoted positions relative to said top frame.

2. A composter, comprising a bottom frame, posts extended vertically between the corners of said frames, louvers mounted horizontally between adjacent posts and slanted downward and inward, grates mounted across the bottom frame, air shields having their top ends pivotally attached to the top frame and having their bottom ends extended downward across the outer faces of said louvers to the bottom frame, and means for holding said air shields in various pivoted positions relative to said top frame, said bottom frame being supported in an elevated position on vertical legs.

3. A composter, comprising a bottom frame, posts extended vertically between the corners of said frames, louvers mounted horizontally between adjacent posts and slanted downward and inward, grates mounted across the bottom frame, air shields having their top ends pivotally attached to the top frame and having their bottom ends extended downward across the outer faces of said louvers to the bottom frame, and means for holding said air shields in various pivoted positions relative to said top frame, said bottom frame being supported in an elevated position on vertical legs, said holding means comprising an elongated bolt pivotally attached at its top end to the bottom corner of each of said air shields and having its bottom end depended along the side of one of said legs, each of said legs being formed in its side adjacent the respective bolt with a vertical line of spaced openings into which the bottom end of the respective bolt can be selectively engaged for supporting the respective shield in a desired pivoted position.

GEORGE H. EARP-THOMAS.

REFERENCES CITED

The following references are of record in the file of this patent:

UNITED STATES PATENTS

| Number | Name | Date |
|---|---|---|
| 280,271 | Willet | June 26, 1883 |
| 1,320,701 | Manns | Nov. 4, 1919 |
| 1,456,332 | Nash | May 22, 1923 |
| 1,471,979 | Richards | Oct. 23, 1923 |
| 1,787,878 | Warden-Stevens | Jan. 6, 1931 |
| 1,903,510 | Laboon et al. | Apr. 11, 1933 |
| 1,919,836 | Goldsborough | July 25, 1933 |
| 1,938,647 | Earp-Thomas | Dec. 12, 1933 |
| 2,043,265 | Roeder | June 9, 1936 |
| 2,178,818 | Earp-Thomas | Nov. 7, 1939 |
| 2,209,613 | Roeder | June 30, 1940 |